April 4, 1961 C. J. STROZIK 2,977,818
PARKING BRAKE ACTUATING MECHANISM
Filed Sept. 26, 1957 2 Sheets-Sheet 1

INVENTOR.
Conrad J. Strozik
BY
His Attorney

April 4, 1961 C. J. STROZIK 2,977,818
PARKING BRAKE ACTUATING MECHANISM
Filed Sept. 26, 1957 2 Sheets-Sheet 2

INVENTOR.
Conrad J. Strozik
BY
His Attorney

United States Patent Office 2,977,818
Patented Apr. 4, 1961

2,977,818

PARKING BRAKE ACTUATING MECHANISM

Conrad J. Strozik, Syracuse, N.Y., assignor to General Motors Corporation, Detroit, Mich., a corporation of Delaware Filed Sept. 26, 1957, Ser. No. 686,428

4 Claims. (Cl. 74—531)

This invention relates to control apparatus for actuating the parking brake mechanism of an automotive vehicle.

In this invention the foot actuated lever is pivotally carried upon a support bracket that is mounted on the fire wall of the automotive vehicle, or otherwise suitably mounted on the body of the vehicle within the passenger compartment. The lever has a depending portion that is provided with a foot pad at the lower end for engagement by the foot of the operator to actuate the lever. A detent mechanism consisting of a cam type detent frictionally engages a bar to hold the lever in an adjusted position. A release pedal is provided adjacent the first mentioned apply pedal to provide for release of the detent mechanism and allow the lever to return to a normal release position. The end of the lever above the pivot connection of the lever to the support forms one link of a quadric crank chain that comprises four links disposed in quadrilateral arrangement whereby to provide a force multiplying system to which the cable for actuating the parking brake is connected.

An object of the invention is to provide an improved construction of actuating mechanism for a parking brake that is less expensive to manufacture and can be formed from stamped sheet metal parts.

Further objects and advantages of the present invention will be apparent from the following description, reference being had to the accompanying drawings wherein a preferred form of the invention is clearly shown.

Figure 1:
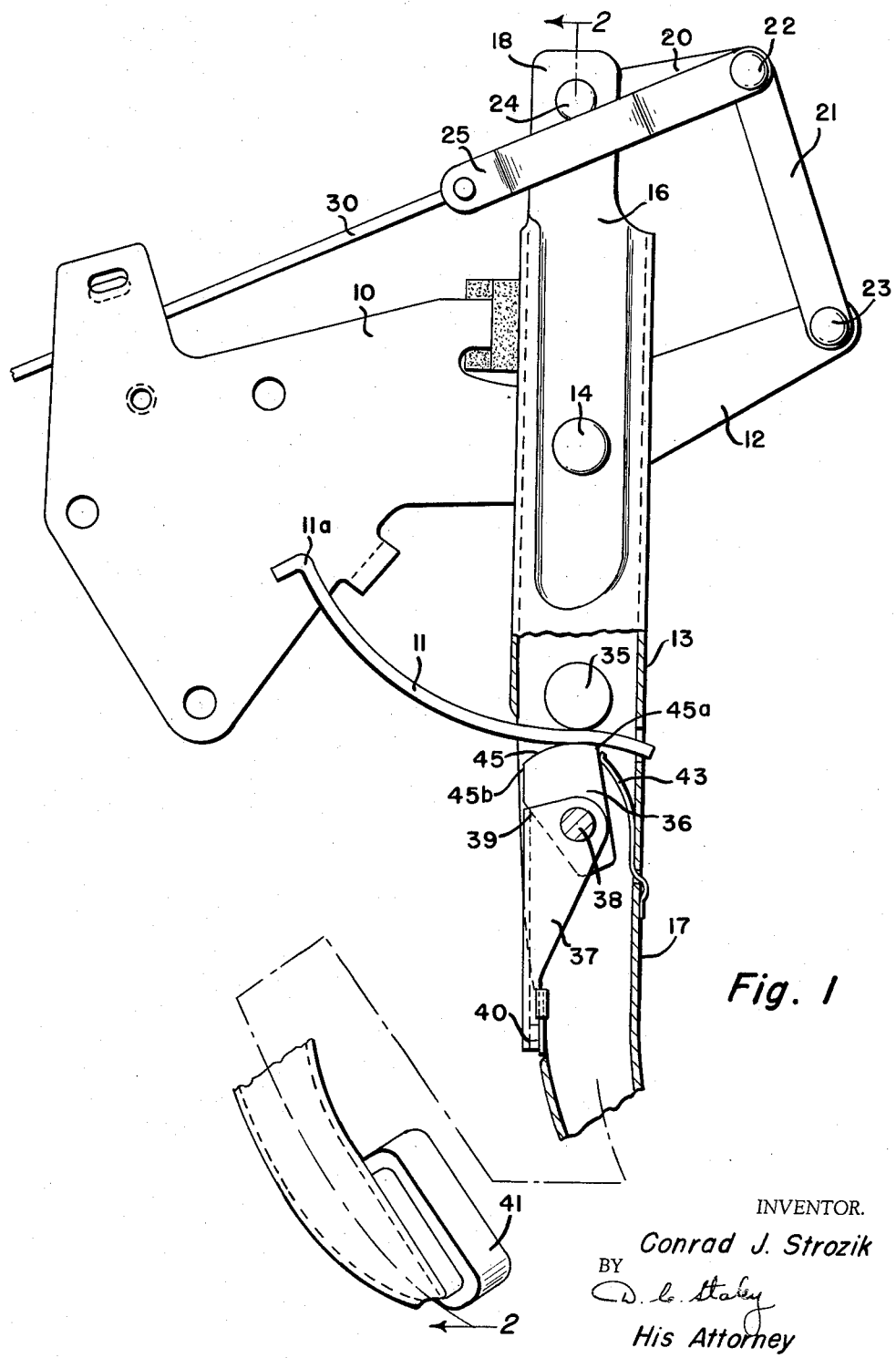
Figure 1 is a side elevational view, partially in cross section illustrating the actuating mechanism of this invention.

Figure 1 illustrates the side elevation view of the brake lever 13 mounted on the support bracket 10. The support bracket 10 is provided with means for mounting within the passenger compartment of the vehicle. The bracket is provided with an extending portion to protect the actuating cable 30 as it extends forward from the cable attachment means 25. The rearward portion of bracket 10 is provided with an arm 12 which pivotly supports links 21 and 21a.

The support bracket 10 supports the lever 13 in a pivoting position by means of the rivet 14. A bumper is also placed between the upper portion 16 of lever 13 between the forward side of support bracket 10. The support bracket 10 carries the bar 11 which is welded at 11a in fixed relation to bracket 10. The bar 11 extends in an arcuate manner from the support bracket 10 and follows through the locking device carried on the lever 13 as the lever is pivoted about the rivet 14. The locking means carried on lever 13 will be described in subsequent paragraphs of this description. Lever 13 is formed from a sheet metal blank and is provided with reinforcing ridges to form a more rigid member.

Figure 2:
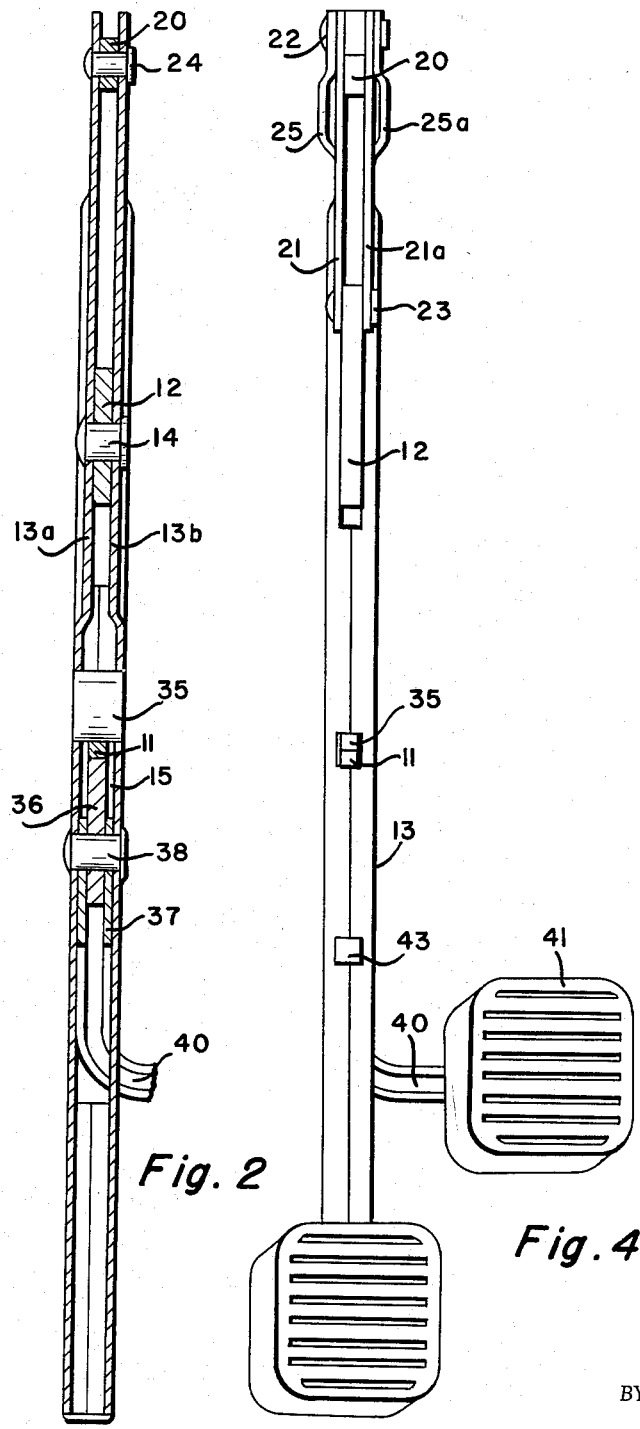
Figure 2 is a cross-section view taken on line 2—2 of Figure 1.

The lever 13 being of a pendant type extends downward from the pivoting point 14 to the portion which seats the pedal pad 41. This lever is illustrated in Figure 1 as having the upper portion 16 and a lower portion 17. The upper portion 16 has the extreme end 18 thereof pivotally supporting a link 20 by means of a pivot pin 24, the link 20 being disposed between the two members 13a and 13b of the lever 13, as shown in Figure 2.

The link 20 supports a pair of parallel links 21 and 21a on opposite sides of the link 20, a pivot pin 22 connecting the adjacent links 20 and 21, 21a. The links 21, 21a are positioned on opposite sides of the arm 12 at the right hand end thereof, as shown in Figure 1, these links being connected to the arm 12 by a pivot connection 23.

The links 20, 21—21a together with the arm 12 and the upper end portion 16 of the lever 13 form a quadric crank chain that comprises four links disposed in quadrilateral arrangement so as to provide a force multiplying system to actuate the brake cable that connects with the parking brake when the lever 16 is rotated about its pivot 14.

Figure 3:
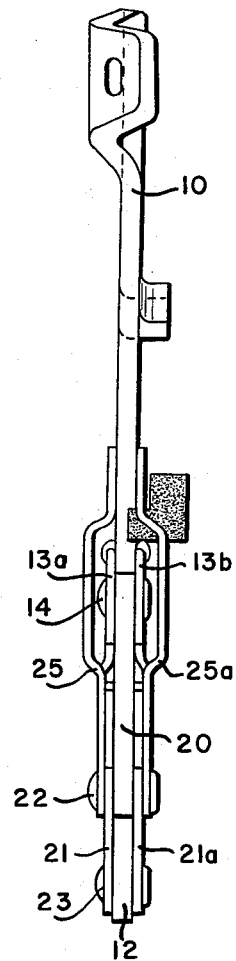
Figure 3 is a top view of the brake lever illustrating the connections of the various links with the brake lever and the support bracket.

The quadric crank chain comprising the links 20, 21—21a, 12 and 16 is connected with a cable attachment means comprising the two links 25 and 25a, as shown in Figures 1 and 3, the links 25—25a being disposed outside the links 21—21a, as shown in Figure 3 with the pivot pin 22 extending through all of the links 25, 21, 20, 21a, 25a. The cable attachment means 25 crosses the quadric crank chain transversely and also crosses the lever 16 so that the movement of the upper end of the lever 16 will effect movement of the cable attachment means 25 in the same direction.

Obviously, when the lever 13 is moved clockwise about its pivot 14 the quadric crank chain will collapse transversely with pivot 24 approaching pivot 23 whereby pivot 22 will be extended to effect a force multiplication from the lever 13 to the cable attachment means 25 to draw the cable 30 and actuate the parking brakes of the automotive vehicle.

A detent mechanism to retain the actuating lever 13 in an adjusted position includes the bar 11 heretofore described. The bar 11 extends through the hollow portion 15 of the lever 13, as shown in Fig. 1. One side of the bar 11 engages a hardened pin 35 that is a press fit between the elements 13a and 13b of the lever 13, shown in Figure 2.

The opposite surface of the bar 11 is engaged by a cam 36 that is pivotally supported on a cam actuating arm 37, the arm 37 being supported on the lever 13 by the pivot pin 38 that also supports the cam 36 on the arm 37. The cam 36 is urged toward a counter-clockwise position by a leaf spring 43, the cam engaging the corner 39 of the arm 37 to limit the counter-clockwise rotation of the cam 36 and also counter-clockwise rotation of the arm 37 as urged by the spring 43.

Figure 4:
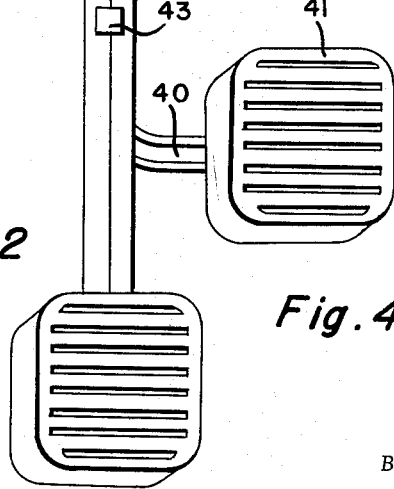
Figure 4 is a front elevation view illustrating the applying and releasing brake pedal pads in connection with the brake lever.

The lower end of the arm 37 has a transversely extending portion 40, as shown in Fig. 4 that carries a foot pad member 41 to effect clockwise rotation of the arm 37 about the pivot when actuated by the operator of the vehicle.

The cam member 36 has the cam surface 45 thereof of gradually reducing radius about the axis of the pivot pin 38 from the forward edge 45a of the cam to the rear edge 45b. Thus when the cam is in the position illustrated in the position of Figure 1, the bar 11 will be frictionally retained between the cam member 36 and the pin 35 so as to prevent counterclockwise rotation of the lever 13 about its pivot 14.

When the operator of the vehicle wishes to set the parking brake, the lever 13 is rotated in a clockwise direction about its pivot 14. When this occurs the cam 36 is urged in rotation in a clockwise direction about its pivot 38 against the action of the spring 43 to place the reduced diameter portion of the cam face 45 adjacent the lower surface of the bar 11 and thereby provide sufficient clearance between the cam and the bar and between the bar and the pin 35 as to allow the lever 13 to move in the clockwise direction as urged by the operator of the vehicle.

When the operator of the vehicle removes his foot from the lever 13, the retraction spring (not shown) that is connected with the cable 30 tends to rotate the lever 13 in a couner-clockwise direction. But upon this action the cam 36 is urged in a counter-clockwise rotation by the spring 43, and by tendency of movement of the lever 13 so as to effect a locking friction engagement of the bar 11 between the pin 35 and the high side of the cam face 45.

The retraction spring heretofore referred to is not illustrated as it is conventional in all brake mechanisms to provide for return of the brakes to a released position.

When the operator wishes to release the parking brake, the foot pad member 41 is engaged whereby to rotate the cam member 36 in a clockwise direction, as viewed in Fig. 1 and thereby place the low side of the cam face adjacent the bar 11 which again gives clearance between the bar and the cam to allow for return movement of the lever 13 to the position illustrated in Fig. 1 as a result of the action of the conventional retraction spring pulling in a left hand direction on the cable 30.

While the form of embodiment of the invention as herein disclosed constitutes a preferred form, it is to be understood that other forms might be adopted as may come within the scope of the claims which follow.

What is claimed is as follows:

1. Mechanism for actuating the parking brakes of a vehicle including, in combination, a stationary support, a bar extending from said support, a lever including pivot means supporting said lever on said support, detent means including a cam element engaging said bar to frictionally hold said lever in an adjusted position relative to said bar, a quadric crank chain on the opposite side of said pivot means with said lever forming one link of said chain and an arm of said support pivotally supporting a link of said chain on its outer side with said lever pivot connection with said support being at the inner end of said arm on said support, and a brake actuating cable attachment means connected with a pivot between immediately adjacent articulated links of said chain positioned in the quadric chain opposite to the pivot connection of said lever on said arm, said cable attachment means extending diagonally across the quadrilateral formed by said quadric chain which includes crossing of said lever whereby to effect movement of the cable attached to said cable attachment means in the same direction as movement of said lever on effecting collapsing movement of said quadric chain to effect extensible movement of the connection of said cable attachment means relative to the pivot connection of said lever on said support.

2. Mechanism for actuating the parking brakes of a vehicle including, in combination, a stationary support, a bar extending from said support, a lever having pivot means supporting said lever on said support whereby said lever has an upper end portion at one side of its pivot and a lower end portion at the opposite side of its pivot, said lower end of said lever being constructed to form a hollow section, detent means carried on said lever and confined within said hollow section and engaging said bar to frictionally hold said lever in an adjusted position relative to said bar, and a quadric crank chain on the upper end of said lever with said lever forming one of the links of said chain and an arm of said support pivotally supporting a link of said chain on its outer end with said lever pivoted at the inner end of said arm, and a brake actuating cable attachment means connected to the pivot means between immediately adjacent articulated links of said chain and disposed in the quadrilateral formed by said quadriric chain in a position opposite to the pivot means of said lever on said arm.

3. Mechanism for actuating the parking brakes of a vehicle including, in combination, a stationary support, a bar extending from said support, a lever having pivot means supporting said lever on said support whereby said lever has an upper end portion at one side of its pivot and a lower end portion at the opposite side of its pivot, said lower end of said lever being constructed to form a hollow section, detent means carried on said lever and confined within said hollow section and engaging said bar to frictionally hold said lever in an adjusted position relative to said bar, said detent means comprising a lever having pivot means supporting the same on said first mentioned lever in said hollow section thereof and a cam member pivotally supported on said pivot means for said second mentioned lever and engaging said bar to effect said frictional holding of said first mentioned lever in its adjusted position, rotation of said second mentioned lever about its pivot causing rotation of said cam to effect disengagement thereof from said bar and allow said first mentioned lever to return to an initial position, and a quadric crank chain on the upper end of said lever with said lever forming one of the links of said chain and an arm of said support pivotally supporting a link of said chain on its outer end with said lever pivoted at the inner end of said arm, and a brake actuating cable attachment means connected to the pivot means between immediately adjacent articulated links of said chain and disposed in the quadrilateral formed by said quadric chain in a position opposite to the pivot means of said lever on said arm.

4. Mechanism for actuating the parking brakes of a vehicle including, in combination, a stationary support, a bar extending from said support, a lever having pivot means supporting said lever on said support whereby said lever has an upper end portion at one side of its pivot and a lower end portion at the opposite side of its pivot, said lower end of said lever being constructed to form a hollow section, detent means carried on said lever and confined within said hollow section and engaging said bar to frictionally hold said lever in an adjusted position relative to said bar, said detent means comprising a lever having pivot means supporting the same on said first mentioned lever in said hollow section thereof and having an arm extending laterally of said first mentioned lever and provided with a foot pad portion on the end thereof to dispose said foot pad portion at one side of said first mentioned lever and a cam member pivotally supported on said pivot means for said second mentioned lever and engaging said bar to effect said frictional holding of said first mentioned lever in its adjusted position, rotation of said second mentioned lever about its pivot causing rotation of said cam to effect disengagement thereof from said bar and allow said first mentioned lever to return to an initial position, and a quadric crank chain on the upper end of said lever with said lever forming one of the links of said chain and an arm of said support pivotally supporting a link of said chain on its outer end with said lever pivoted at the outer end of said arm, and a brake actuating cable attachment means connected to the pivot means between immediately adjacent articulated links of said chain and disposed in the quadrilateral formed by said quadric chain in a position opposite to the pivot means of said lever on said arm.

(References on following page)

References Cited in the file of this patent

UNITED STATES PATENTS

| | | |
|---|---|---|
| 1,553,591 | Berry | Sept. 15, 1925 |
| 1,572,370 | Smith | Feb. 9, 1926 |
| 2,014,300 | Strobridge | Sept. 10, 1935 |
| 2,126,392 | Jandus | Aug. 9, 1938 |
| 2,183,772 | Johnson | Dec. 19, 1939 |
| 2,299,508 | Skareen | Oct. 20, 1942 |
| 2,315,704 | Hoch | Apr. 6, 1943 |
| 2,555,811 | Peterson | June 5, 1951 |
| 2,587,725 | Hinsey | Mar. 4, 1952 |
| 2,755,891 | Lovell et al. | July 24, 1956 |
| 2,872,830 | Hinsey | Feb. 10, 1959 |
| 2,875,641 | Powell | Mar. 3, 1959 |
| 2,881,637 | Hinsey | Apr. 14, 1959 |
| 2,884,803 | Willis | May 5, 1959 |
| 2,915,916 | Hinsey | Dec. 8, 1959 |